A. MERO.
Rotary Harrow.
No. 53,850
Patented Apr. 10, 1866
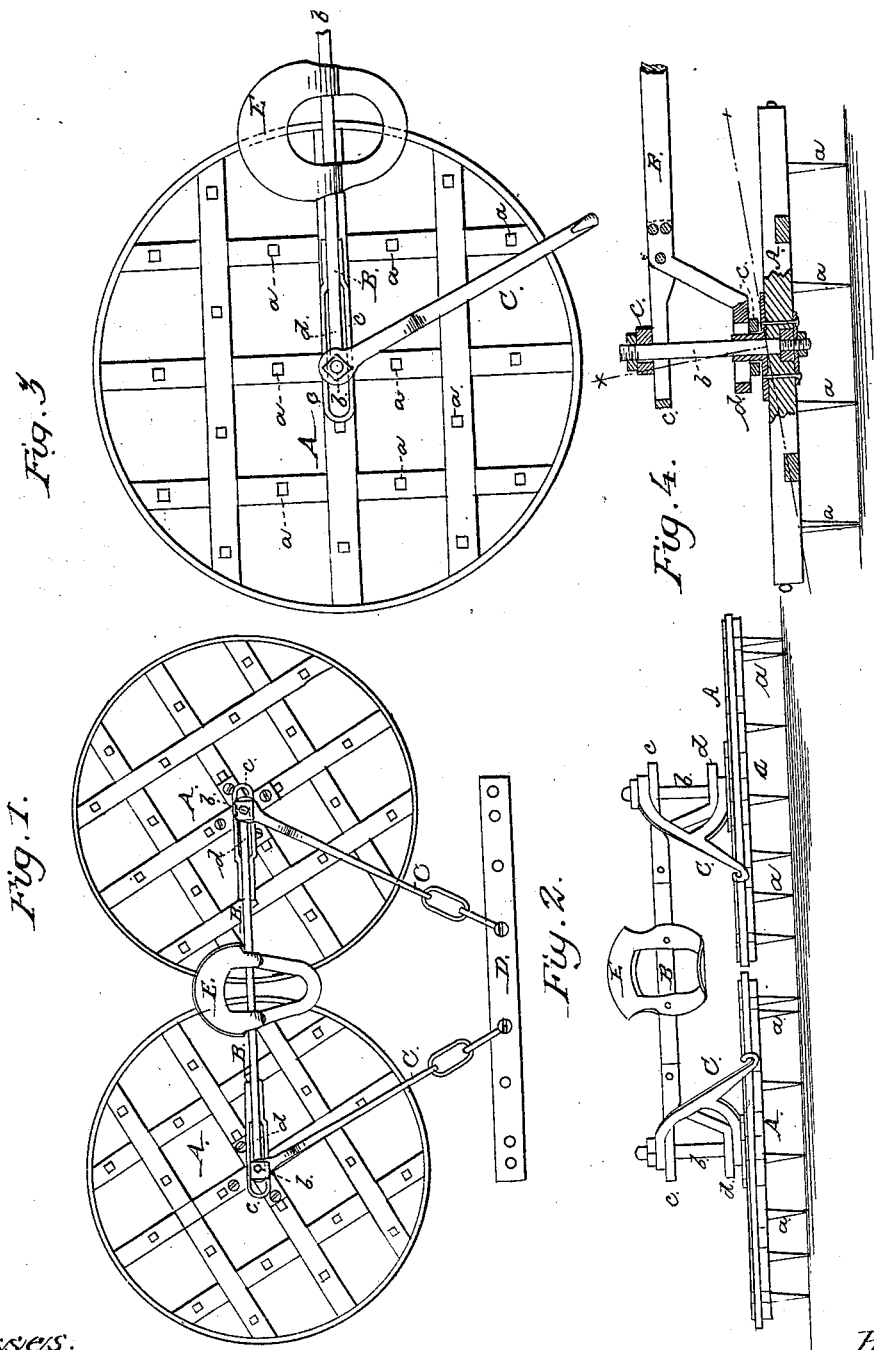

UNITED STATES PATENT OFFICE.

ANTHONY MERO, OF NEW HAVEN, MICHIGAN.

IMPROVEMENT IN HARROWS.

Specification forming part of Letters Patent No. 53,850, dated April 10, 1866.

*To all whom it may concern:*

Be it known that I, ANTHONY MERO, of New Haven, Macomb county, State of Michigan, have invented a new and Improved Harrow; and I do hereby declare that the following is a full, clear, and exact description thereof, reference being had to the accompanying drawings, making a part of this specification, in which—

Figure 1 is a plan view of the improved harrow. Fig. 2 is a front elevation. Fig. 3 is an enlarged view of one of the harrows and the driver's seat attached. Fig. 4 is a vertical section through Fig. 3.

Similar letters of reference indicate corresponding parts in the several figures.

The object of this invention is to connect two circular harrows together by a single bar in such manner that the harrows are free to oscillate or rotate about their axes, and at the same time to accommodate themselves to the inequalities of the surface over which they are drawn, as will be hereinafter described.

Another object of my invention is to provide for locating the driver upon the bar which connects the two harrows together, said bar being so constructed as to admit of the rotary and vibratory movements of the harrows, as will be hereinafter described.

To enable others skilled in the art to understand my invention, I will describe its construction and operation.

In the accompanying drawings, A A represent two circular harrows of equal size, which are made up of beams of a suitable size and strength, which are crossed and halved together, as shown in Figs. 1, 3, and 4. The ends of these beams are cut off the proper length to form circular frames, which are braced and strengthened by means of bands or tires of iron, as shown in the drawings.

The harrow-teeth *a a* are driven through the frames of the harrows and secured thereto in any suitable manner.

Each harrow has a perpendicular post, *b*, projecting upward from its center, which post is rigidly secured to it by collar-plates or otherwise.

B represents a bar or bridge, which connects the two harrows A A together by their perpendicular posts *b b*.

The bridge-bar B has its ends forked, so as to form upper bearings and connections, *c c*, and lower bearings and connections, *d d*, as shown in Fig. 2.

In the sectional view, Fig. 4, the ends of the bar B are shown in the form of oblong slots, which allow the harrows to assume any plane and to conform to uneven surfaces over which they may be drawn.

The ends of the bar B are held in their proper places by means of the forked drag-bars C C, the forked ends of which receive the posts *b b* above and below the looped ends of the bridge-bar B, the whole being held in their places by means of nuts on the upper ends of said posts, as shown in the drawings.

The forward ends of the drag-bars C C are connected to a double-tree, D, by means of links and clevises, as shown in Fig. 1, and said bars C C are bent downward, so as to bring the line of draft so low that the back parts of the harrows shall not be lifted by the front teeth catching into obstructions. A number of holes may be made in the double-tree D at different distances from its extremities, to admit of the drag-bars C C being separated or brought nearer together at their front ends.

The driver's seat E is bolted rigidly to the bridge-bar B in such a position that the weight of the driver, when he is upon this seat, will be distributed equally upon the two harrows A A at the centers thereof.

It will be seen from the above description of the double harrow that the single bar B serves the purpose of a connecting-bar; also as bearings for the turning-posts of the harrows; as guides for allowing these posts, with their harrows, to vibrate; and, finally, as a support for the driver's seat. This bar has its ends forked in such manner that no other braces are required than those which this bar affords.

Having thus described my invention, what I claim as new, and desire to secure by Letters Patent, is—

1. The construction of the bridge-bar B with slotted and forked ends, adapted for receiving and serving as bearings for the central turning-posts, $b\,b$, of the harrows, substantially as described.

2. The combination of the forked drag-bars C C with the forked bridge-bars B and the central posts, $b\,b$, substantially as described.

3. The combination of the seat E with the forked bridge-bar B and rotary harrows A A, substantially as described.

ANTHONY $\overset{\text{his}}{\times}$ MERO.
mark.

Witnesses:
J. R. CRANDALL,
E. DUVAL.